United States Patent [19]
Scopp

[11] 3,725,184
[45] Apr. 3, 1973

[54] COATED VINYL FILM
[75] Inventor: Howard A. Scopp, Branford, Conn.
[73] Assignee: Addressograph-Multigraph Corporation, Cleveland, Ohio
[22] Filed: Feb. 4, 1971
[21] Appl. No.: 112,644

[52] U.S. Cl. ................161/6, 40/2.2, 156/277, 156/313, 156/333, 161/254, 161/256, 161/413
[51] Int. Cl. ....B32b 27/04, B32b 27/30, B32b 31/12
[58] Field of Search..........161/254, 413, 6, 5, 38, 39, 161/252, 256; 40/2.2, 2 R; 156/277, 291, 309, 333, 313

[56] References Cited
UNITED STATES PATENTS

| | | | |
|---|---|---|---|
| 3,068,140 | 12/1962 | Biddle | 156/277 X |
| 3,511,655 | 5/1970 | Haas et al. | 96/29 |
| 3,582,439 | 6/1971 | Thomas | 161/5 |
| 3,578,538 | 5/1971 | Prosser et al. | 161/6 |

Primary Examiner—Daniel J. Fritsch
Attorney—Russell L. Root and Ray S. Pyle

[57] ABSTRACT

A laminated article in which a composition containing polyvinyl chloride, polyvinyl acetate and polyvinyl alcohol is interposed between a vinyl skin and the printing on the surface of a vinyl core to improve the adhesion between the skin and the printing ink.

A method of laminating is also claimed.

8 Claims, 3 Drawing Figures

PATENTED APR 3 1973                3,725,184

HOWARD A. SCOPP
INVENTOR

BY Ray S Pyle
ATTORNEY

COATED VINYL FILM

This invention relates to the laminating art and, more particularly, to an improvement in a laminated article having a printed surface at the laminar interface, and to a method of making the same.

The invention is especially applicable to the manufacture of credit card blanks and will be described with particular reference thereto. However, it will be appreciated that the invention has much broader applications and will find utility in the manufacture of any article having laminated vinyl plastic elements embodying a printed surface at the laminar interface.

In general, credit card blanks are formed of a core consisting of a rigid vinyl plastic sheet and skins laminated thereto, consisting of flexible vinyl plastic films.

The resin ingredient in the core may consist of a homopolymer of polyvinyl chloride or a copolymer consisting of a major proportion of polyvinyl chloride and a minor proportion of polyvinyl acetate. The term "vinyl sheet" as used in the specification is intended to embrace homopolymers and copolymers.

Similarly, the resin ingredient in the film may consist of a homopolymer of polyvinyl chloride or a copolymer consisting of a major proportion of polyvinyl chloride and a minor proportion of polyvinyl acetate. The term "vinyl film" as used in the specification is intended to embrace homopolymers and copolymers.

As is well known, credit cards contain printed matter, identifying in part the organization issuing the credit card, and embossed characters, identifying in part the name and account number of the credit card holder. The embossed characters may additionally reflect the address of the card holder and in some cases, an expiration date for the credit card.

In conventional practice the printing is applied directly to the vinyl sheet, while the embossing is effected after the core has been laminated between the vinyl films.

Until recently the printing on the vinyl sheet has been limited to those portions which would not be embossed. This was done to maximize the useful life of the credit cards. The embossing operation as well as the flexing of the embossed characters when operated upon by a data recorder, tend to promote delamination between the skin and the core. The bond between the unprinted portions of the vinyl sheet and the vinyl film is much stronger than between the printing ink and the vinyl film. Since the latter interface is much more prone to delamination, printed matter was kept away from the areas to be embossed.

In an effort to create more distinctive credit cards, some are now being designed with overall printed matter so that it is no longer possible to emboss only nonprinted areas of the card. This has been a contributing factor to a growing problem of premature credit failure due to delamination.

Other contributing factors include the shift by some card manufacturers from off-set lithographic inks to dry off-set inks which seem to adhere less well to vinyl film. This problem is particularly severe with dry off-set inks which are tailored for compatibility with extruded vinyl sheet. The problem is somewhat less severe with dry off-set inks tailored for compatibility with calendered vinyl sheet.

It will be appreciated that as more and more of the laminar interface is covered with printing ink, the problem of delamination becomes intensified, even in the absence of embossing. Mere flexing of the card can result in delamination, and this is most likely to occur where bleed edge printing, i.e., printing to the edge of the card, is encountered. Cards of conventional manufacture with bleed edge printing will delaminate with as little force as a finger flicked against the edge of the card.

It is apparent from the foregoing discussion that there is a need for a laminating system offering improved adhesion between a printed surface and a vinyl film. The present invention is addressed to satisfying this need.

It has been found, in accordance with the present invention, that a substantial improvement in adhesion between the printed surface portions of a vinyl sheet, and a vinyl film can be achieved by interposing between the film and the ink, a composition containing polyvinyl chloride, polyvinyl acetate and polyvinyl alcohol.

More specifically, and in accordance with one aspect of the present invention, there is provided a laminated article comprising a vinyl sheet having a surface at least a portion of which is printed with a compatible printing ink, a generally transparent vinyl film laminated to the sheet, and the dry residue of a composition containing on a solids basis from about 88 to about 94 weight percent polyvinyl chloride, from about 2 to about 6 weight percent polyvinyl acetate and from about 2 to about 10 weight percent polyvinyl alcohol interposed between the film and at least the printed portion of the sheet.

In accordance with another aspect of the invention there is provided a method of improving the adhesion between the printing ink on a vinyl sheet and a vinyl film laminated thereto, which comprises interposing between the film and the printing ink a composition containing on a solids basis from about 88 to about 94 weight percent polyvinyl chloride, from about 2 to about 6 weight percent polyvinyl acetate and from about 2 to about 10 weight percent polyvinyl alcohol, and then laminating the vinyl film and the printed surface of the vinyl sheet.

It is therefore an object of the present invention to provide an improvement in credit card blanks and similar laminated articles by increasing their resistance to delamination between the printed surface of the core and the skin laminated thereto.

A further object of the invention is to improve the adhesion between printing ink on a vinyl sheet, and a vinyl film, by interposing between the ink and the film a composition containing polyvinyl chloride, polyvinyl acetate and polyvinyl alcohol.

Another object of the invention is to provide a novel method for improving the adhesion between printing ink on a vinyl sheet, and a vinyl film.

These and other objects and advantages of the invention will become apparent from the following detailed description when taken in conjunction with the accompanying drawing in which.

Figure 1:
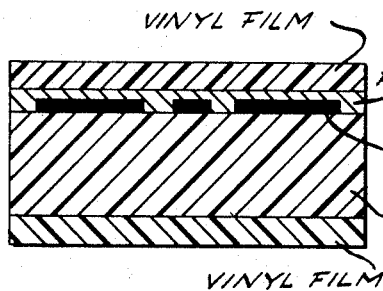
FIG. 1 is a schematic section view of a first embodiment of laminated article, corresponding to the present invention.
Figure 2:
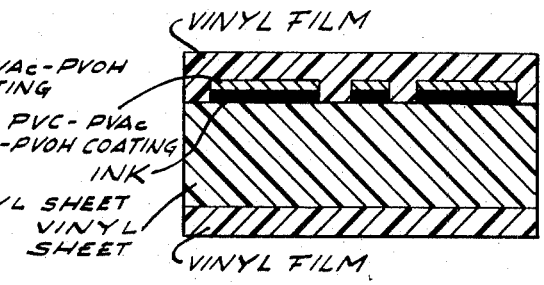
FIG. 2 is a schematic section view of a second embodiment of laminated article, corresponding to the present invention.

Referring to the drawing, FIGS. 1 and 2 show two embodiments of laminated structures, for example credit cards, with the various elements identified with suitable word legends. Each structure consists of a core formed of a vinyl sheet. The upper surface of the sheet is partially covered with printing ink. It will be appreciated that the invention contemplates covering an entire surface of the vinyl sheet core with ink, and even applying ink to both surfaces.

Outer skins, identified in the drawing as "vinyl film" are secured to both surfaces of the vinyl sheet. Interposed between the upper, printed, surface of the vinyl sheet and the vinyl film laminated thereto is a layer identified in the drawings as "PVC-PVAc-PVOH." This represents the dry residue of a composition containing polyvinyl chloride, polyvinyl acetate, and polyvinyl alcohol.

In FIG. 1 the composition is shown as covering the entire printed surface of the vinyl sheet, both the unprinted portions of the sheet as well as the exposed surface of the printing ink. This structure can be prepared by applying the composition as a coating either to the film or to the printed surface of the vinyl sheet. The coating should be dried before the vinyl sheet and vinyl film are laminated to each other. This permits evaporation of the solvents or vehicles in the coating composition so that they will not interfere with the laminating process.

The preferred practice is to apply the composition to the vinyl film as a separate operation and then store the coated film until it is needed. In this way the printing and laminating of the core can proceed without a time delay which would otherwise be required for drying the coating composition.

The embodiment illustrated in FIG. 2 differs from that of FIG. 1 only in the fact that the coating composition is deposited selectively so that it provides an interface only between the ink and the film, and not between the unprinted portions of the vinyl sheet and the film. This can be accomplished by using stenciling, electrostatic coating or other well known procedures for selectively depositing coating compositions. If the equipment for selective coating is available, this procedure can effect a cost saving in coating material since much less is used. From the standpoint of resistance to delamination the two embodiments are equivalent since the adhesion promoting composition neither enhances nor weakens the excellent bond between the vinyl film and unprinted vinyl sheet.

It will be understood that where the second surface of the vinyl sheet core is provided with printing ink, it may be desirable to interpose a composition containing polyvinyl chloride, polyvinyl acetate and polyvinyl alcohol between the ink on the second surface and the vinyl film laminated to it, especially if the printing appears on a portion of the card or other article which is to be embossed.

Vinyl sheet material suitable for use as a core material in making credit card stock and similar laminated articles in accordance with the invention, are commercially available. In general, these sheets are composed of a rigid vinyl composition which may consist of a homopolymer of polyvinyl chloride or a copolymer consisting of a major proportion of polyvinyl chloride and a minor proportion of polyvinyl acetate. Commercially available calendered vinyl sheet which may be used in the practice of the invention include Nixon 5193 manufactured by Nixon-Baldwin Division of Tenneco Inc., and Union Carbide 3603 manufactured by Union Carbide Corporation.

Vinyl films useful in the practice of the invention are also commercially available. Such films, as well as the vinyl sheets described above, are free of plasticizer and either consist of a homopolymer of polyvinyl chloride or a copolymer consisting of a major proportion of polyvinyl chloride and a minor proportion of polyvinyl acetate.

Where the laminated card is to have a white or lightly colored surface, some care must be exercised in the selection of a compatible combination of vinyl film and vinyl sheet. Some vinyl compositions are stabilized with lead carbonate, and others with tin mercaptide. When these two stabilizers are brought together under the heat and pressure of lamination, they will decompose and react to produce lead sulfide. This black compound will contribute gray overtones to a white or lightly colored background. For this reason it may be necessary or desirable to identify the stablizers used in the vinyl film and vinyl sheet to be certain they are compatible.

Commercially available vinyl film which may be used in the practice of the invention include Nixon 1142 manufactured by Nixon-Baldwin Division of Tenneco Inc. and Union Carbide 0411 and 0414 manufactured by Union Carbide Corporation.

The printing ink employed forms no part of the present invention and is not critical insofar as the efficacy of the invention is concerned. However, it is necessary that the printing ink be tailored for and compatible with the vinyl sheet to be printed. It is known for example, that printing inks which are satisfactory for use on calendered vinyl sheet may not dry satisfactorily on extruded vinyl sheet. However, once a compatible combination of printing ink and vinyl sheet has been found, practice of the invention can be expected to improve the bond between the printing ink and the vinyl film. Printing inks which are compatible with both calendered vinyl sheets and extruded vinyl sheets are commercially available from Pope & Gray, Division of Martin Marietta Corporation under the trademark VINYLAM.

While the thickness of neither the vinyl sheet nor the vinyl film is critical, for reference purposes it may be noted that the sheet will generally have a thickness within the range of about 0.010 inches to about 0.030 inches. Suitable film thicknesses include the range of about 1 to about 3 mils.

Compositions containing polyvinyl chloride, polyvinyl acetate and polyvinyl alcohol which are useful in the practice of the present invention are commercially available. While the relative proportions of polyvinyl chloride and polyvinyl acetate do not appear to be critical in achieving improved adhesion between the ink and the vinyl film, the proportion of polyvinyl alcohol appears to contribute to this phenomenon. Thus, it has been found that improved adhesion can be anticipated if the proportion of polyvinyl alcohol is at least about 2 weight percent and preferably within the range of about 4 to about 8 weight percent, based on the total weight of the composition, on a solids basis.

A suitable commercial composition is sold by Union Carbide Corporation under the designation VAGH. This terpolymer is believed to contain about 91 weight percent polyvinyl chloride, about 3 weight percent polyvinyl acetate and about 6 weight percent polyvinyl alcohol, on a solids basis.

To be useful in the practice of the invention the commercially available composition must be diluted with a suitable solvent to provide a composition containing from about 5 to about 18 weight percent solids and preferably about 7 weight percent solids.

The solvent should be selected so that in the time it takes for evaporation, it will not have any substantial detrimental effect on the vinyl film or vinyl sheet. Further, the solvent should evaporate within a reasonable period of time at temperatures not exceeding about 150° F lest distortion of the substrate occur. Suitable commercially available solvents include ethylene glycol monoethyl ether and ethylene glycol monomethyl ether, both sold by Union Carbide Corporation under the names Cellosolve and Methyl Cellosolve, respectively.

Figure 3:
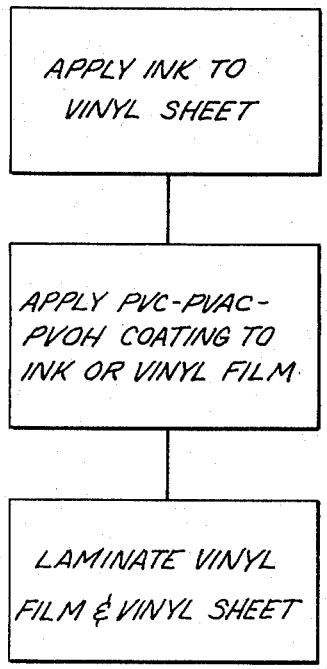
FIG. 3 is a block diagram representing a method of producing laminated articles in accordance with the present invention.

With reference to FIG. 3 of the drawings, it will be seen that the method of the invention involves three principal steps, the first of which is the application of ink to the vinyl sheet. This is most frequently accomplished either by off-set lithography or dry off-set printing.

The next step involves the application of the polyvinyl chloride, polyvinyl acetate, polyvinyl alcohol composition either to the ink (and optionally, the surrounding unprinted portions of the vinyl sheet) or to the vinyl film. It will be appreciated that where the coating is applied to the vinyl film the order of the printing and coating steps may be reversed.

Coating of the vinyl film may be accomplished by any one of a number of well known coating methods. These include spray coating, doctor coating, roller coating and the like. The thickness of the applied coating is not critical and can be varied over reasonable wide limits. In general, thicknesses within the range of about 0.2 mils to about 0.4 mils produces satisfactory results. Thicker coatings can be used but may be difficult to justify economically. Stated another way, the deposition of 1 gram of coating solids per 1,000 square inches of film will produce a coating of adequate thickness.

As an alternative procedure, the coating may be applied directly to the printed surface of the vinyl sheet using the same coating methods described above for coating the vinyl film. If desired the application of the coating may be limited to the printed portions of the surface of the vinyl sheet, in which case masking, stencils, or electrostatic coating procedures must be employed to localize the application of the coating composition.

The third step of the method involves laminating the vinyl film and vinyl sheet. Conventional laminating conditions of time, temperature and pressure may be employed: of which 4 minutes at about 325° F and 20 tons are typical.

EXAMPLE I

A series of credit card blanks were prepared by printing Pope & Gray VINYLAM dry off-set inks (orange OOV-2077 and buff YOV-3793-B) on pieces of Carbide 3603 vinyl sheet having a thickness of 0.0265 inches.

The vinyl sheet was laminated with vinyl film some of which were uncoated film, and the rest were laminated with film coated with Carbide VAGH, a composition containing polyvinyl chloride, polyvinyl acetate and polyvinyl alcohol, which was diluted with ethylene glycol monomethyl ether as a solvent. The laminating conditions for all of the sheets was the same.

The sheets were cut into cards which were then embossed using a Graphotype 6400. Eight cards formed with uncoated film were embossed with 7 characters of number 245C type and 15 characters of number 250C type. Thus, all eight cards contain 56 characters of number 245C type and 120 characters of number 250C type. Eight cards laminated with the coated vinyl film were embossed in the same manner and with the same number and type of characters.

Each card was then subjected to a 100 cycle impression run with a data recorder. This simulated the wear a credit card receives in 100 credit transactions. The cards were then examined under a microscope for signs of delaminate.

The eight cards laminated with uncoated vinyl film showed 20 laminate separations in the 56 characters of number 245C type, and 1 laminate separate for the 120 characters of number 250C type.

The eight cards laminated with the coated vinyl film showed only 2 laminate separations among the 56 characters of number 245C type and no separations among the 120 characters of the number 250C type.

Since the cards formed with uncoated vinyl film are of commercial quality, the improved resistance to delamination achieved with the cards formed with vinyl film coated in accordance with the invention is deemed to be quite significant.

EXAMPLE II

A series of credit card blanks were prepared by printing a vinyl sheet formed of a polyvinyl chloride homopolymer with Pope & Gray VINYLAM dry off-set inks. The colors used were orange (OOAV-3117) and buff (YOAV-8664).

Half of the printed card blanks were laminated at 300° F with an extruded vinyl film. The other half of the cards were laminated with the same film which had been previously coated with a Cellosolve solution, of a polyvinyl chloride-polyvinyl acetate-polyvinyl alcohol composition sold by Union Carbide under the designation VAGH. These laminates were also formed at 300° F.

Peel Test

The ease or difficulty with which the vinyl film could be peeled away from the printed surface was rated by cutting a "V" into the film over a printed portion of the sheet. The film was peeled away and quantitatively evaluated by determining the amount of ink pulled away with the film. The more ink retained on the film, the greater the adhesion between the film and the ink.

For each color of ink, the adhesion between the uncoated film and the ink was rated "poor." The film peeled away quite readily. The film retained virtually its original colorless, translucent properties, indicating that very little ink was pulled away with the film.

The coated film pulled away from the ink with considerably greater difficulty. Here the film adopted the coloration of the printing ink. The intensity of pigmentation of the film was about the same as that remaining on the underlying sheet, indicating that roughly half of the ink was pulled away with the coated film. It was concluded that the strength of bond between the coated film and ink was brought up to at least the level of the ink's cohesive bond. This represents the maximum improvement which can be obtained. These results were regarded as "excellent."

Delamination Test

A series of cards, some with coated films and others with uncoated films were embossed over the printed portions with the full alphabet and several numerals using a Graphotype 6400 embosser. The embossed characters had an average height of 17 mils. The characters were examined under a microscope for evidence of delamination attributable to the embossing operation.

Half of the cards with coated film and half with uncoated film were placed in a flexing machine flexed to an amplitude of 1 ½ inches at a rate of 45 flexes per minute, until 100 flexes had been logged. These specimens were then reexamined under a microscope to determine the extent to which flexing contributed to delamination.

These data show an elimination of incidents of delaminations with cards laminated with coated film under the test conditions reported.

EXAMPLE III

Additional credit card and blanks were prepared using the same plastic sheet, plastic film and coating composition described in EXAMPLE II. The inks used, however, were commercially available off-set lithographic inks. Various colors and different laminating temperatures were employed to determine the effect, if any, these variables have on the bond developed between the printing ink and the vinyl film.

The printing on the vinyl sheet was extended to the edge of the sheet to intentionally create a "bleed edge" printing problem. Bleed edge printing has heretofore been avoided because the vinyl film-to-printing ink adhesion was so poor that the film easily peeled off during casual handling and delaminated during embossing. After lamination, the film at the edge of the card was flicked with the fleshy part of the thumb to see if delamination could be induced. The results of this test are reported in the table below under the column "FILM-EDGE TEST." The "poor" result reported means that the film was easily removed by the procedure described, whereas the reported result "excellent" means that the film was not delaminated by the procedure described.

The laminated cards were also subjected to the flexing and peel tests described in EXAMPLE II. The results of these tests are also reported in TABLE II below.

TABLE II

| Color | Film | Laminating temperature, °F. | Percent delamination Before flex | Percent delamination After flex | Peel test | Film-edge test |
| --- | --- | --- | --- | --- | --- | --- |
| Gold | Uncoated | 300 | 100 | 100 | Very poor | Poor. |
| Do | Coated | 300 | 0 | 0 | Excellent | Excellent. |
| Do | Uncoated | 315 | 57.9 | 68.4 | Poor | Poor. |
| Do | Coated | 315 | 0 | 0 | Excellent | Excellent. |
| Green | Uncoated | 300 | 100 | 100 | Poor-fair | Poor. |
| Do | Coated | 300 | 0 | 0 | Excellent | Excellent. |
| Do | Uncoated | 315 | 94.7 | 97.4 | Poor-fair | Poor. |
| Do | Coated | 315 | 0 | 0 | Excellent | Excellent. |
| Black | Uncoated | 300 | 100 | 100 | Very poor | Poor. |
| Do | Coated | 300 | 0 | 0 | Excellent | Excellent. |
| Do | Uncoated | 315 | 76.3 | 84.2 | Poor | Poor. |
| Do | Coated | 315 | 0 | 0 | Excellent | Excellent. |
| Red | Uncoated | 300 | 100 | 100 | Very poor | Poor. |
| Red | Coated | 300 | 34.2 | 64.8 | Good | Excellent. |
| Red | Uncoated | 315 | 97.4 | 100 | Poor | Poor. |
| Red | Coated | 315 | 0 | 2.6 | Excellent | Excellent. |
| Brown | Uncoated | 300 | 100 | 100 | Very poor | Poor. |
| Do | Coated | 300 | 73.7 | 97.4 | Good | Excellent. |
| Do | Uncoated | 315 | 100 | 100 | Pooor-fair | Poor. |
| Do | Coated | 315 | 26.3 | 52.6 | Excellent | Excellent. |

The results are reported in the table below. The "% DELAMINATIONS" reported in the right hand columns were arrived at by dividing the total number of characters embossed on the specimens into the number of characters showing evidence of delamination and multiplying by 100.

TABLE I

| Ink | Film | Before Flexing | % Delaminations After Flexing |
| --- | --- | --- | --- |
| Orange | Uncoated | 94.7 | 100 |
| Orange | Coated | 0 | 0 |
| Buff | Uncoated | 100 | 100 |
| Buff | Coated | 0 | 0 |
| Ochre | Uncoated | 63.2 | 73.7 |
| Ochre | Coated | 0 | 0 |
| Blue | Uncoated | 100 | 100 |
| Blue | Coated | 0 | 0 |

The data in the above table clearly indicate that the invention provided substantially improved resistance to delamination for every color of off-set lithographic ink tested. The results of the peel test and film edge test also confirm that the invention makes bleed edge printing of vinyl sheet for credit cards and similar articles, a practical reality.

The present invention has been described in conjunction with certain specific embodiments. However, it will be appreciated that various changes may be made in the illustrated embodiments without departing from the intended scope and spirit of the present invention.

I claim:

1. A laminated article comprising a vinyl sheet having a surface at least a portion of which is printed with a compatible printing ink, a generally transparent vinyl film laminated to said sheet and the dry residue of a composition comprising on a solids basis from about 88 to about 94 weight percent polyvinyl chloride, from about 2 to about 6 weight percent polyvinyl acetate and from about 2 to about 10 weight percent polyvinyl alcohol interposed between said film and at least the printed portion of said sheet.

2. A credit card blank comprising a vinyl sheet member laminated between two vinyl film members, printing on at least one surface of said vinyl sheet member and a composition comprising on a solids basis from about 88 to about 94 weight percent polyvinyl chloride, from about 2 to about 6 weight percent polyvinyl acetate and from about 2 to about 10 weight percent polyvinyl alcohol interposed between the printed surface of said vinyl sheet member and the vinyl film member laminated thereto.

3. A laminated article comprising a vinyl sheet having a surface at least a portion of which is printed with an ink compatible therewith, selected from the group consisting of off-set lithographic and dry off-set inks laminated to a generally transparent vinyl film having a surface thereof coated with the dry residue of a composition comprising on a solids basis from about 88 to about 94 weight percent polyvinyl chloride, from about 2 to about 6 weight percent polyvinyl acetate, and from about 2 to about 10 weight percent polyvinyl alcohol, the coated surface of said film being in contact with the printed surface of said sheet.

4. A method of forming a laminate from a vinyl sheet core and a vinyl film skin, which comprises printing at least one surface of a vinyl sheet with an ink compatible therewith, applying a coating of a composition comprising on a solids basis, from about 88 to about 94 weight percent polyvinyl chloride, from about 2 to about 6 weight percent polyvinyl acetate and from about 2 to about 10 weight percent polyvinyl alcohol to one of (a) at least the printed portion of the printed surface of said vinyl sheet and (b) a surface of said vinyl film, and laminating said film and said sheet such that said coating is interposed between said film and the printing on the surface of said sheet.

5. The method as defined in claim 4 wherein said composition is applied as a solvent solution comprising from about 5 to about 18 weight percent solids, which solids consist of about 91 weight percent polyvinyl chloride, about 3 weight percent polyvinyl acetate and about 6 weight percent polyvinyl alcohol.

6. The method as defined in claim 5 wherein said solvent is selected from the group consisting of ethylene glycol monomethyl ether and ethylene glycol monoethyl ether.

7. A method of improving the adhesion between the printing ink on an at least partially printed surface of a vinyl sheet and a generally transparent vinyl film laminated thereto, which comprises interposing between said film and at least the printed portion of said printed surface a composition comprising, on a solids basis, from about 88 to about 94 weight percent polyvinyl chloride, from about 2 to about 6 weight percent polyvinyl acetate and from about 2 to about 10 weight percent polyvinyl alcohol, and then laminating said vinyl film and the printed surface of said vinyl sheet.

8. The method as defined in claim 7 wherein said composition is applied as a coating to said vinyl film.

* * * * *